United States Patent [19]

Yabuta et al.

[11] Patent Number: 4,480,714
[45] Date of Patent: Nov. 6, 1984

[54] SYSTEM FOR PREVENTING CARRIER FROM TURNING SIDEWAYS

[75] Inventors: Takenobu Yabuta, Takatsuki; Takashi Sugata, Ryugasaki, both of Japan

[73] Assignee: Toyo Umpanki Co., Ltd., Osaka, Japan

[21] Appl. No.: 386,321

[22] Filed: Jun. 8, 1982

[30] Foreign Application Priority Data

Mar. 5, 1982 [JP] Japan ................... 57-35537

[51] Int. Cl.³ .............................................. B60R 21/00
[52] U.S. Cl. .................. 180/290; 340/52 R; 340/62; 340/71; 414/21
[58] Field of Search ................ 180/285, 290; 414/673, 414/674, 719, 21; 280/755, 757; 340/52 R, 62, 71

[56] References Cited

U.S. PATENT DOCUMENTS

| 1,503,851 | 8/1924 | Rodi | 180/285 |
| 4,206,829 | 6/1980 | Melocik | 180/290 |
| 4,221,530 | 9/1980 | Williams et al. | 180/285 |
| 4,340,235 | 7/1982 | Thompson | 180/290 |
| 4,354,568 | 10/1982 | Griesenbrock | 180/290 |

Primary Examiner—Richard A. Bertsch
Attorney, Agent, or Firm—Armstrong, Nikaido, Marmelstein & Kubovcik

[57] ABSTRACT

A system for preventing a vehicle from turning sideways comprises a unit for measuring the weight of a cargo on the vehicle, a unit for measuring the height of gravitational center of the cargo on the vehicle, a unit for measuring the steering angle of the vehicle, and a unit for measuring the running speed of the vehicle. The static stability of the vehicle is derived from the weight and the height of gravitational center of the vehicle and the measured weight and height of gravitational center of the cargo. The dynamic instability of the vehicle during turning is derived from the measured steering angle and running speed. First and second allowable limits are determined according to the static stability. When the dynamic instability exceeds the first allowable limit, the clutch of the vehicle is disengaged, and when the instability exceeds the second limit, the vehicle is braked. Upon the dynamic instability exceeding each allowable limit, information to that effect is given.

7 Claims, 13 Drawing Figures

SYSTEM FOR PREVENTING CARRIER FROM TURNING SIDEWAYS

BACKGROUND OF THE INVENTION

The present invention relates to a system by which cargo transport vehicles, such as straddle carriers for transporting containers and like large cargoes, can be prevented from turning sideways, i.e. turning over and lying on one side.

The straddle carrier itself has a large height and carries a large-sized container or like heavy cargo as held at an elevated level and is therefore subjected to a great centrifugal force when turning. Since the straddle carrier is used at a wide work site, it is required that the carrier run at a speed, for example, of several tens of kilometers per hour which is relatively high for working vehicles of this type. The centrifugal force acting on a running vehicle is proportional to the second power of its speed, so that the straddle carrier frequently turns over on one side when turning at a high speed.

When considering the fact that the centrifugal force acting on a turning vehicle is in proportion to the square of speed and in inverse proportion to the turning radius, it appears useful to control the turning radius of the vehicle running at a high speed so that the turning radius will increase in proportion to the second power of the speed. This can be realized, for example, by limiting the output angle of the power steering system when a high speed is reached, or by giving an increased reaction to the steering wheel at a high speed to necessitate a greater force for turning the handle. However, if the output angle of the power steering system is made variable with the speed, the turning radius of the vehicle varies with the speed even when the angle of rotation of the steering wheel is definite, giving a strange feel to the driver, hence being hazardous. Further if the steering wheel is given an increased reaction, a great force is needed also for returning the steering wheel to its neutral position. What is most important, the centrifugal force relates also to the height and weight of the cargo on the vehicle, so that it is impossible to completely prevent the vehicle from turning sideways merely by controlling the vehicle in accordance with the speed alone.

SUMMARY OF THE INVENTION

An object of the present invention is to provide a system for preventing a carrier from turning sideways reliably at all times irrespective of the level and weight of the cargo on the carrier.

Another object of the invention is to prevent a carrier or like vehicle from turning sideways while rendering the vehicle easy to drive without giving any strange feel to the driver.

Still another object of the invention is to always give the driver information relating to the likelihood of turning sideways.

The system of the present invention for preventing a vehicle from turning sideways comprises means for measuring the weight of a cargo on the vehicle, means for measuring the height of gravitational center of the cargo on the vehicle, means for measuring the steering angle of the vehicle, means for measuring the running speed of the vehicle, means for determining the overall height of gravitational center of the vehicle and the cargo from the weight and the height of gravitational center of the vehicle and the measured weight and height of gravitational center of the cargo and deriving the static stability of the vehicle from the overall height of gravitational center, means for deriving the dynamic instability of the vehicle during turning from the measured steering angle and running speed, means for comparing the dynamic instability with the static stability and emitting a control signal when the instability is in excess of an allowable limit dependent on the stability, and speed control means for the vehicle controllable by the control signal. The speed control means disengages a clutch provided between the running power source of the vehicle and the drive wheels thereof, or brakes the vehicle. Preferably the allowable limit is set in two stages. When the instability has exceeded the first allowable limit, the clutch is disengaged. The vehicle is braked upon the instability exceeding the second allowable limit.

According to the invention, the overall height of gravitational center of the vehicle and the cargo calculated based on the measured weight and height of gravitational center of the cargo on the vehicle is considered in addition to the centrifugal force acting on the vehicle during turning of the vehicle, so that the vehicle can be prevented from turning sideways reliably at all times irrespective of the weight and height of the cargo retained on the vehicle. The present invention is useful generally for cargo carrying vehicles and also for special vehicles, such as straddle carriers, for carrying heavy containers, etc. as suspended at a high level. In fact, the invention is very useful for preventing such special vehicles from turning down on one side. Further according to the invention, the speed of the vehicle is controlled when there arises a likelihood of turning sideways, so that the driver can handle the vehicle in such a case with the usual sense of driving. This assures high safety.

The driver's compartment of the vehicle is provided with a display unit for presenting a graph showing the relation between the steering angle and the running speed allowable in terms of static stability. The dots representing steering angle and running speed measurements are displayed on the unit to give the driver information relating to the likelihood of turning sideways. Thus the vehicle can be driven with safety with reference to the information.

Other features and details of the invention will become apparent from the following description of embodiments with reference to the accompanying drawings.

DESCRIPTION OF THE PREFERRED EMBODIMENTS

Figure 1:
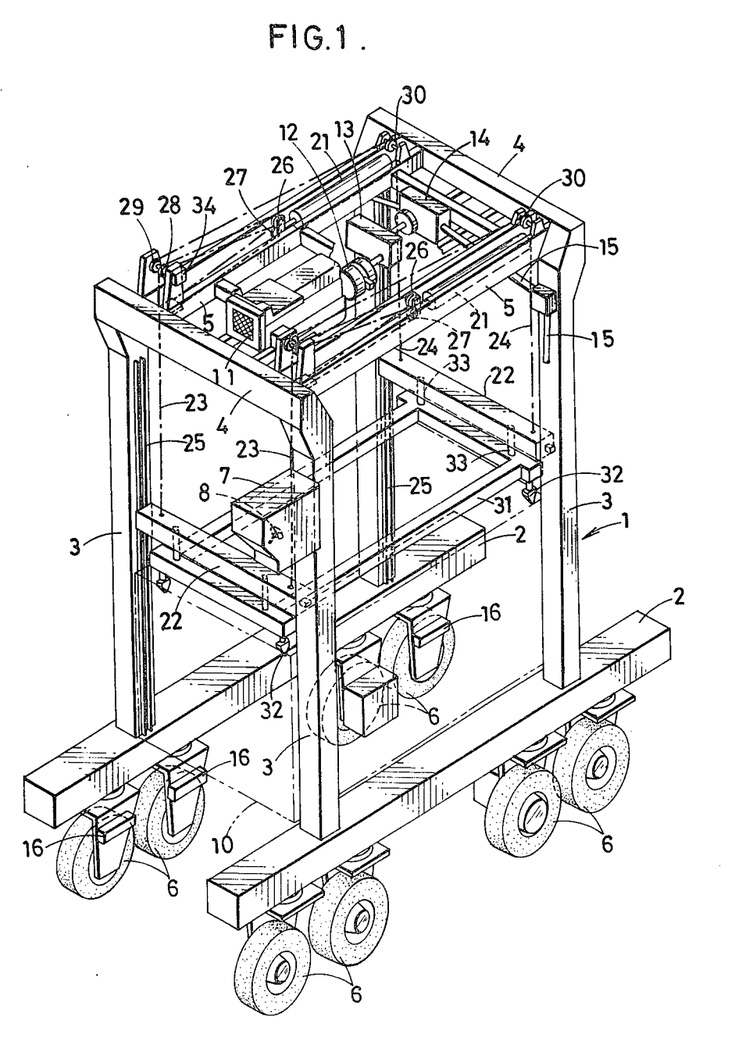
FIG. 1 is a perspective view showing a straddle carrier.

FIG. 1 generally shows a straddle carrier for transporting large-sized containers. The carrier has a frame 1 formed with a central space for accommodating a container 10 and comprising a pair of opposite lower longitudinal members 2, posts 3 extending upward from front and rear portions of each longitudinal member 2, upper lateral members 4 laterally interconnecting the posts 3 at their upper ends, and upper longitudinal members 5 longitudinally interconnecting the posts 3 at their upper ends. Two lateral pairs of wheels 6 are provided at each of front and rear portions of the frame 1. The wheels 6 at each side of the frame 1 will be referred to as first, second, third and fourth wheels from front to rear.

The frame 1 is provided at an upper portion with an engine 11 serving as the running power source of the carrier, a torque convertor 12, a transmission gear box 13 and a differential gear box 14 which are supported by brackets or like members. A propeller shaft 15 extends laterally from each side of the gear box 14 and further extends along each rear post 3 downward via a gear box. The third wheel 6, serving as a drive wheel, is driven by the power delivered thereto through the propeller shaft 15. A clutch for effecting or interrupting the transmission of the power of the engine 11 to the drive wheels 6 is housed in the transmission gear box 13. Each of the wheels other than the third wheels, i.e. drive wheels, is provided with a disk brake 16.

A driver's compartment 7 is mounted on an upper portion of one of the front posts 3. The driver's compartment 7 is provided in its interior with a steering wheel 8, a clutch pedal, a brake pedal, the display unit 56 to be described later, and other pedals, levers, buttons, instruments, etc. needed for driving. A power steering system (not shown) including a steering cylinder, a link assembly, etc. is disposed inside and below the lower longitudinal members 2. All the wheels 6 are steered by an angle in accordance with the angular displacement of the steering wheel 8 by the steering system.

The frame is provided with a hoist assembly consisting chiefly of hoist cylinders 21 mounted on the upper longitudinal members 5, a pair of front and rear lateral support members 22 vertically movable along guides 25 on the posts 3 inside thereof, and chains 23 and 24 suspending the lateral members 22 at their opposite ends. Two sprocket wheels 26 and 27 are rotatably mounted on the forward end of rod of each cylinder 21. Each longitudinal member 5 is rotatably provided with two sprocket wheels 28, 29 at its front end and a sprocket wheel 30 at its rear end. Each of the chains 23 having the front lateral member 22 suspended therefrom is attached at one end to the lateral member 22, reeved around the sprocket wheels 28, 26 and attached at the other end to the front end of the longitudinal member 5. Each of the chains 24 suspending the rear lateral member 22 is attached at one end to the member 22, reeved around the sprockets 30, 29, 27 and fastened at the other end to the front end of the longitudinal member 5.

A suspending frame 31 is movably suspended from the lateral members 22 by arms 33. Suspending rods 32 are provided at the four corners of the frame 31, inserted into slots formed at the four corners of the top of the container 10 and rotated through 90°, whereby the container 10 is suspended from and held by the frame 31. The rods of the hoist cylinders 21, when advanced or retracted, lower or raise the suspending frame 31 and the container 10 thereby held. As is well known, the container 10 is transported as suspended from and held by the upper portion of the frame 1.

The level of the container 10 is measured by detectors 34 which are rotation transducers for detecting the amount and direction of rotation of the sprocket wheels 28 and 29. The sprocket wheels 28 and 29 are rotated by the chains 23 and 24 by an amount in proportion to the amount of vertical movement of the suspending frame 31 in accordance with the direction of the movement. The detectors 34 may produce analog signals or pulse signals insofar as the signals are in proportion to the amount of rotation of the sprocket wheels 28, 29 and indicative of the direction of the rotation.

Figure 2:
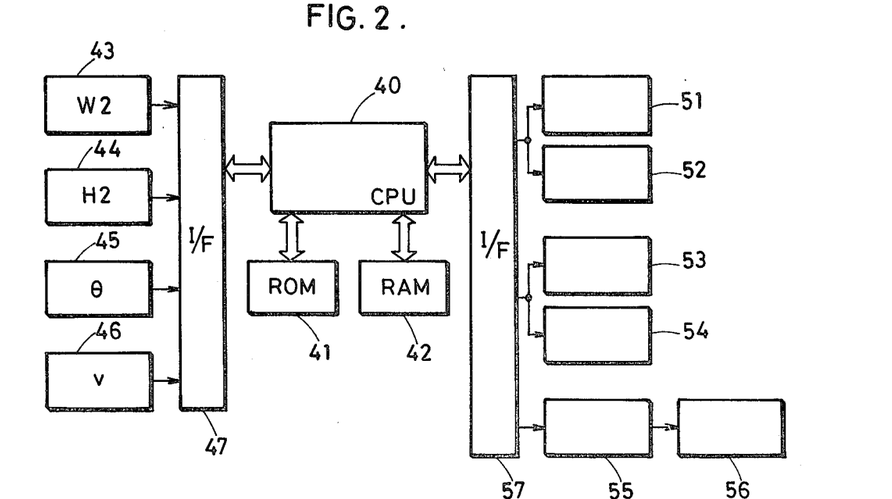
FIG. 2 is a block diagram showing the electric construction of an embodiment of the invention.

FIG. 2 shows the electric construction of the present system. The overall operation of the system is controlled by a central processing unit (CPU) 40. The CPU 40 is preferably a microprocessor. The CPU 40 is provided with a read-only memory (ROM) 41 having its program stored therein, and a random access memory (RAM) 42 for storing various items of data. The CPU 40 receives through an interface 47 signals representing the measured values obtained by means 43 for measuring the weight of the container 10, means 44 for measuring the level of the container 10 and determining the height of gravitational center thereof, means 45 for measuring the steering angle of the carrier, and means 46 for measuring the running speed of the carrier. The CPU 40 emits through an interface 57 a first-stage control signal (first control signal) and a second-stage control signal (second control signal) for preventing the carrier from turning sideways. The first control signal is given to an alarm lamp 51 and to clutch control means 52, and the second control signal is delivered to an alarm buzzer 53 and brake control means 54. The CPU 40 also delivers display data to display control means 55 to show on a display unit 56 a graph representing the relation between the steering angle and the running speed allowed in respect of static stability, and dots representing steering angle and running speed measurements. The lamp 51, the buzzer 53 and the display unit 56 are arranged within the driver's compartment 7. The display unit is a cathode-ray tube (CRT) or plasma display.

Figure 4:
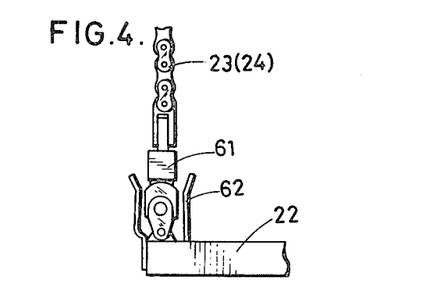
FIGS. 4 and 5 show an example of means for measuring the weight of a container, FIG. 4 being a front view showing the means as installed in place and FIG. 5 being a block diagram showing the electric circuit thereof.
Figure 5:
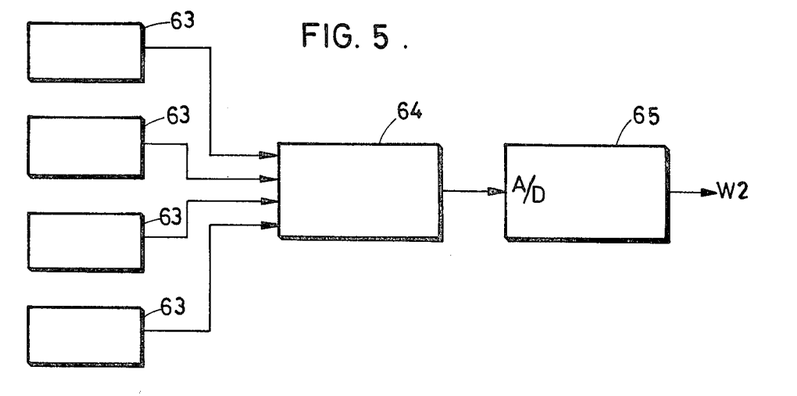

FIGS. 4 and 5 show an example of means 43 for measuring the weight of the container. The end of the chain 23 or 24 connected to the lateral member 22 has a load cell 61, to which a strain gauge is adhered for measuring the tensile force acting on the chain 23 or 24. A stopper 62 serves to restain the lower end of the chain when the chain slackens to some extent. The load cell 61 is attached to the lower end of each of the chains 23, 24. The strain gauges on the four load cells 61 are connected to bridge circuits 63 individually, and the outputs of the bridge circuits 63 are fed to an adder 64. Since the sum of the forces acting on the four chains 23, 24 is the weight of the container 10, the output from the adder 64 represents the weight W2 of the container 10. The output from the adder 64 is converted to a parallel digital signal by an A/D convertor 65 and then fed to the CPU 40.

Figures 6, 7:
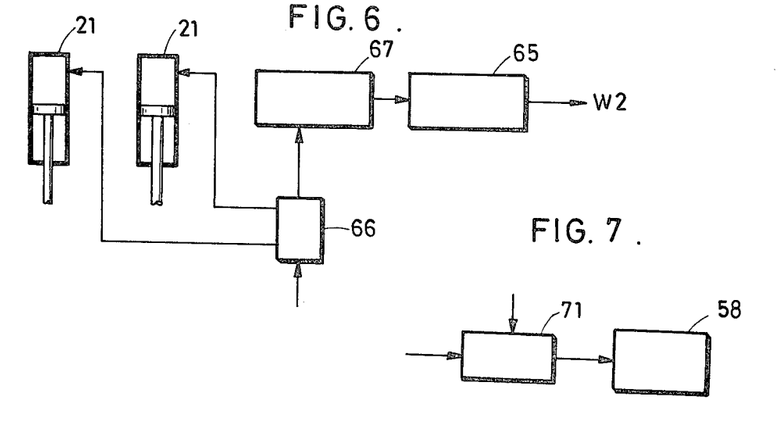
FIG. 6 is a block diagram showing another example of the measuring means.
FIG. 7 is a block diagram showing an example of clutch control means.

FIG. 6 shows another example of weight measuring means 43, which is adapted to detect the pressure of oil flowing into the hoist cylinders 21. The pressure oil is fed to the cylinders 21 via a divider 66. The pressure of oil is measured by a pressure gauge 67 at the dividing point. Since the pressure at the dividing point indicates the sum of the forces acting on the cylinders 21, the output of the pressure gauge 67 represents the weight W2 of the container 10. The output of the gauge 67 is subjected to A/D conversion.

The means 44 for measuring the height of gravitational center of the container comprises the aforementioned rotation transducers 34, an arithmetic circuit for subjecting the output signals from the transducers 34 to addition or subtraction according to the direction of rotation, and a convertor for converting the output of the arithmetic circuit to a parallel digital signal. The height of the container 10 is predetermined. If the position of the gravitational center is predetermined at a specified location along the height, e.g. at the center, a signal representing the height, H2, of gravitational center of the container 10 can be obtained.

The steering angle measuring means 45 and the vehicle speed measuring means 46 are already well known. The means 45 is adapted to detect the angular displacement of the steering wheel 8 and includes, for example, a rotational potentiometer or magnetroelectric transducer (e.g. Hall device) for delivering a voltage output representing the displacement. The sliding member of the potentiometer performs a circular motion with the shaft carrying the wheel 8. When a magnetroelectric transducer is used, a magnet is attached to the shaft, and the transducer is disposed as opposed to the magnet. The running speed is measured by a speedometer, for example, a rotation transducer for detecting the number of revolutions of a suitable shaft of the power transmission system. In any case, the measured steering angle $\theta$ and speed V are converted to digital signals and thereafter fed to the CPU 40. Although the steering angle $\theta$ is directional, the absolute value relative to the neutral position, if measured, fully serves the contemplated purpose.

Figure 10:
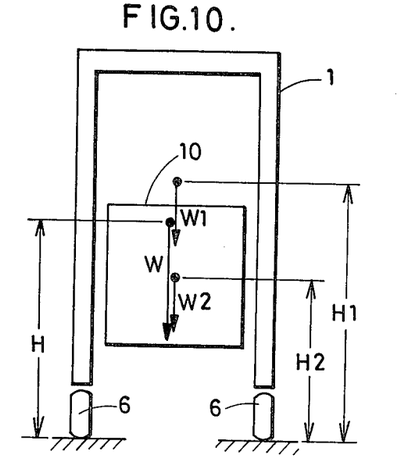
FIGS. 10 to 12 show models illustrating the basic concept of the invention.
Figure 11:
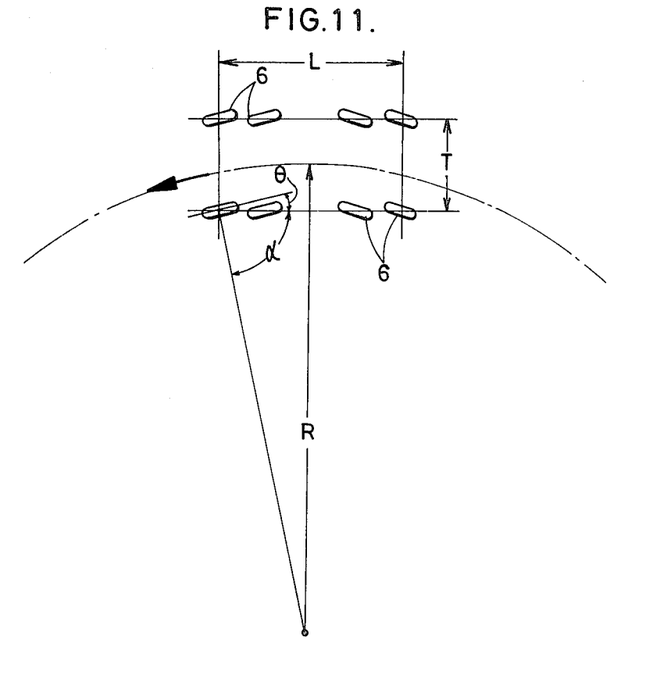
Figure 12:
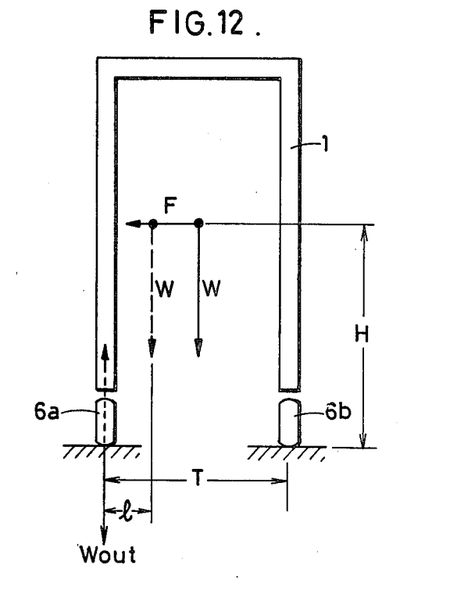

FIGS. 10 to 12 show models representing the basic concept of this invention for preventing turning sideways. With reference to FIG. 10, W1, H1, W and H are defined as follows.

W1: the weight of carrier.
H1: the height of gravitational center of carrier.
W: the total weight of carrier and container.
H: the overall height of gravitational center of carrier and container combined.

The container has a weight W2 and a height of gravitational center H2, so that the following equations are established.

$$W = W1 + W2 \tag{1}$$

$$H \cdot W = H1 \cdot W1 + H2 \cdot W2 \tag{2}$$

Equations (1) and (2) lead to the following equation.

$$H = \frac{H1 \cdot W1}{W1 + W2} + \frac{H2 \cdot W2}{W1 + W2} \tag{3}$$

FIG. 11 shows how the carrier is turned by operating the steering wheel 8. With reference to this drawing, R, L, T and $\alpha$ are as defined below.

R: turning radius.
L: the distance from the first wheel to the fourth wheel (wheelbase).
T: the distance between the opposite side wheels (tread).

With use of the steering angle $\theta$, we have the following relations.

$$\alpha = 90° - \theta \tag{4}$$

$$\tan \alpha = (R - T/2)L/2 \tag{5}$$

Equation (5) gives the following equation.

$$R = (L/2) \cdot \tan \alpha + T/2 \tag{6}$$

Although the angle measured by the steering angle measuring means 45 and the angle through which the first wheels are actually steered are both represented by $\theta$, no particular trouble will arise since these angles are proportional. Further although the angles through which the opposite first wheels are steered are different from each other, the average of these angles is taken as $\theta$. The turning radius R of the carrier is obtained from Equations (4) and (6) or from modifications of these equations when desired, with use of the measured steering angle $\theta$.

The forces acting on the carrier during turning are illustrated in FIG. 12, in which F, g and Wout are as follows.

F: centrifugal force during turning.
g: acceleration of gravity (9.8 m/sec²).
Wout: load on outer wheels during turning.

The centrifugal force F is represented by the following equation with use of the speed V, total weight W and turning radius R.

$$F = \frac{V^2 \cdot W}{R \cdot g} \tag{7}$$

It is now assumed that the position of the overall gravitational center is shifted by the centrifugal force F during turning to a location at a distance l from the outer wheel 6a, as indicated in broken like. If the moment of the reaction (indicated in broken line) against the force exerted on the outer wheel 6a and the moment due to the assumed center of gravity, each about the inner wheel 6b, are in equilibrium, we have the following equation.

$$Wout \cdot T = (T - l) \cdot W \tag{8}$$

This leads to $$l = \left(1 - \frac{Wout}{W}\right) \cdot T \tag{9}$$

On the other hand, if the moment of the reaction against the force acting on the outer wheel 6a and the combined moment of the total weight W and the centrifugal force F, each about the inner wheel 6b, are in equilibrium, we have the following equation.

$$Wout \cdot T = (T/2) \cdot W + F \cdot H \tag{10}$$

Equations (7) and (10) give the following equation.

$$\frac{W_{OUT}}{W} \cdot T = \frac{V^2 \cdot H}{R \cdot g} + \frac{T}{2} \quad (11)$$

Substitution of Equation (11) in Equation (9) gives $$l = T - \left(\frac{V^2 \cdot H}{R \cdot g} + \frac{T}{2}\right) \quad (12)$$

$$= \frac{T}{2} - \frac{V^2 \cdot H}{R \cdot g}$$

The stability S of the carrier during turning is defined by the following equation.

$$S = l/H \quad (13)$$

Substituting Equation (12) for $l$ in Equation (13), we obtain $$S = T/2H - V^2/(R \cdot g) \quad (14)$$

T/2H herein represents stability at rest, while $V^2/(R \cdot g)$ represents instability in a dynamic state. The condition under which the carrier turns sideways is $l = 0$, i.e.

$$S = 0 \quad (15)$$

Accordingly $$T/2H < V^2/(R \cdot g) \quad (16)$$

Thus the carrier turns sideways when the dynamic instability exceeds the static stability.

If S=0 in Equation (14), the speed V in the critical state of turning sideways is given by $$V = \sqrt{\frac{R \cdot g \cdot T}{2H}} \quad (17)$$

Figure 3:
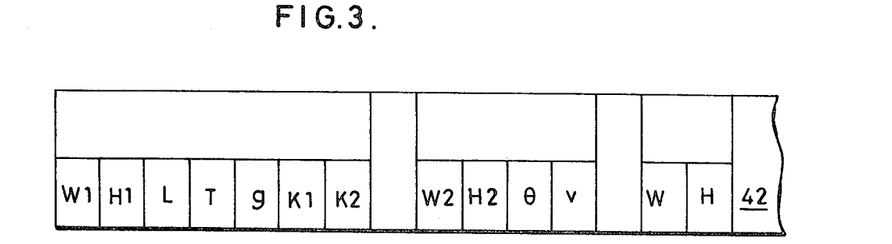
FIG. 3 is a diagram showing part of RAM.

FIG. 3 shows part of the RAM 42, which has an area for storing various constants including W1, H1, L and T which are dependent on the carrier, the acceleration of gravity g and safety factors K1 and K2, an area for storing the measured values W2, H2, θ and V, and an area for storing the W and H values calculated with use of Equations (1) and (2). The two safety factors K1 and K2 are both smaller than 1 and K1 < K2.

Figure 9:
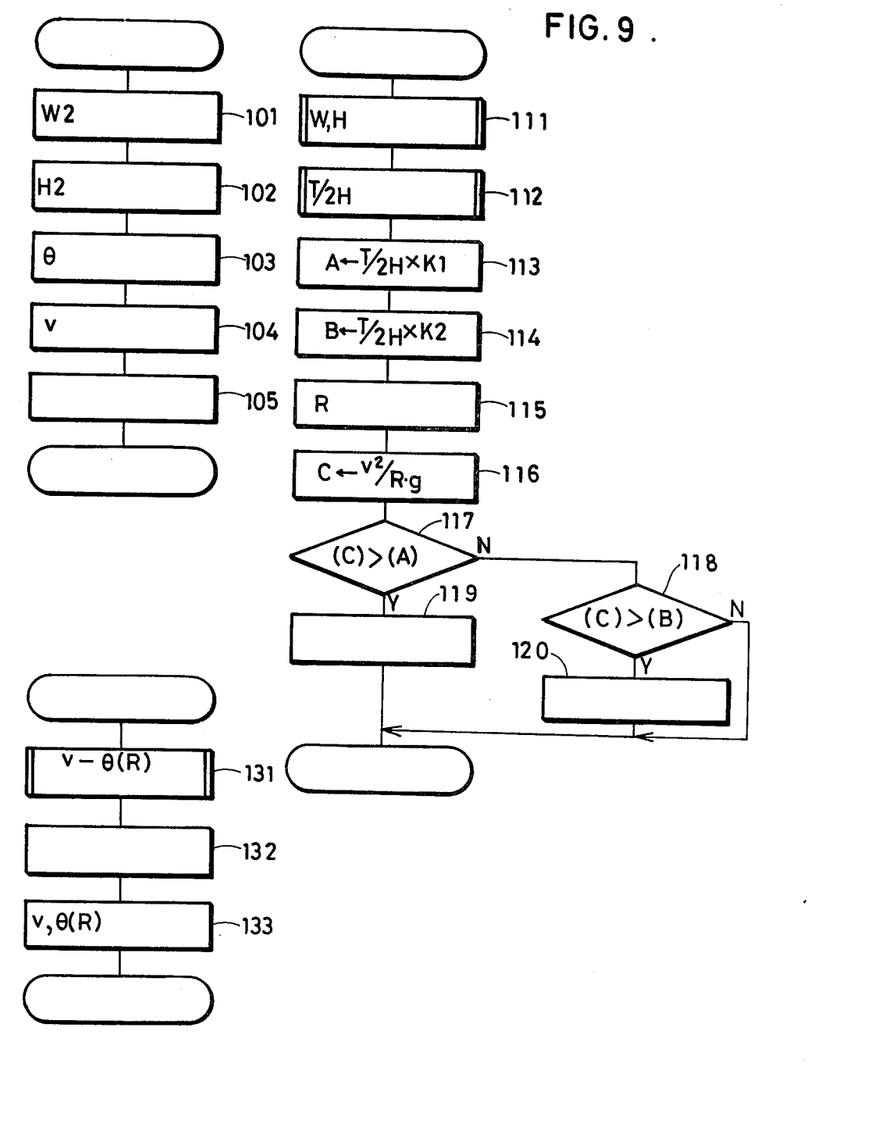
FIG. 9 is a flow chart showing the processing steps of CPU.

FIG. 9 shows the steps of processing by the CPU. The CPU processing includes data reading process, arithmetic control process and display process. These processes are performed concurrently. In the data reading process, the container weight W2, height of gravitational center of container H2, steering angle θ and speed V given by the means 43 to 46 are read (steps 101 to 104), and these items of data are stored in the RAM 42. When the container 10 is lifted to a specified level as suspended from the suspending frame 31, the weight W2 and height of gravitational center H2 of the container 10 are determined, so that the reading steps of 101 and 102 may be carried out after the container 10 has been set in place. On the other hand, the steering angle θ and the speed V are read repeatedly with a very short cycle, and the latest data is stored in the RAM 42. Alternatively such data may be loaded into a suitable register.

In the arithmetic control process, the total weight W and the overall height of gravitational center H are computed from Equations (1) and (3) with use of the constants W1 and H1 and the measured values W2 and H2, and the values are stored in the RAM 42 (step 111). The static stability T/2H is calculated with use of the constant T and the calculated value H (step 112). Subsequently the stability T/2H is multiplied by the safety factors K1 and K2 to obtain first and second allowable limits, which are loaded into registers A and B respectively (steps 113, 114). On completion of the setting of the container 10, these limits are determined, so that steps 111 to 114 may be carried out on completion of setting.

The constants L and T and the measurement θ are substituted in Equations (4) and (6) to calculate the turning radius R (step 115). The calculated value R, measured value V and constant g are used to calculate the dynamic instability $V^2/(R \cdot g)$, which is loaded into a register C (step 116). The dynamic instability in the register C is then compared with the first allowable limit in the register A and thereafter with the second allowable limit in the register B (steps 117, 118). If the dynamic instability exceeds the first allowable limit, a first control signal is given (step 119). If the instability exceeds the second limit, a second control signal is emitted (step 120). When the instability is smaller than either of the allowable limits, no control signal is delivered. The steps 115 to 120 are repeated with a very short cycle. Although numerical equations are used for the arithmetic steps 111, 112, 115, 116, etc., the values concerned can be obtained with reference to tables previously prepared and stored in the RAM 42. Use of table is advantageous especially for calculating the turning radius R in step 115.

In response to the first control signal, the alarm lamp 51 goes on, informing the driver of a likelihood of turning sideways. At the same time, the cltuch in the transmission box 13 is disengaged. With the power no longer delivered to the drive wheels, the carrier slows down spontaneously. When the second control signal is emitted, the buzzer 53 goes on, notifying the driver of a great danger, and the brakes 16 function to forcibly slow down the carrier, whereby the vehicle is prevented from turning down on one side.

Figure 13:
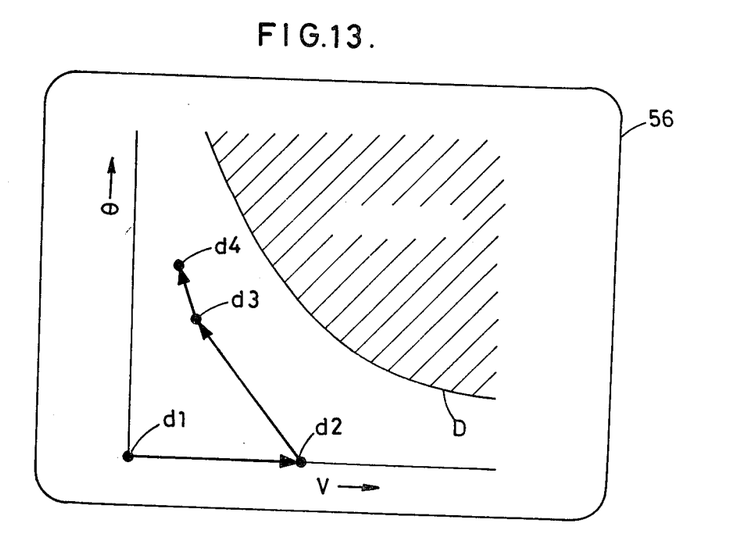
FIG. 13 shows an example of image on a display unit.

In the display process, data for a graph showing the relation between the speed V and the steering angle θ (or turning radius R) in the critical state of turning sideways is prepared with use of Equations (4), (6) and (7) (step 131), and the data is fed to the control means 55 (step 132). Preferably the safety factors K1, K2 or some other values are incorporated into the graph. FIG. 13 shows an exemplary image on the display unit 56. The speed V is plotted as abscissa, and the steering angle θ as ordinate. A graph D is shown based on the data. The hatched area above the curve D is the area involving the likelihood of turning sideways. Since the graph D is determined upon completion of setting of the container 10, the graph data preparing procedure may be carried out only once.

In the display process, the measured values V and θ are delivered, and bright spots d1 to d4, etc. are shown on the display unit 56 to represent such measurements from moment to moment (step 133). While the carrier is at rest, the spot indicative of the running state of the carrier is at the origin of the coordinate system as indicated at d1. When the carrier advances straight, the spot advances on the abscissa as indicated at d2, representing the speed at the time concerned. If the steering wheel 8 is rotated to turn the carrier, the spot departs from the abscissa and shifts to a position corresponding to the speed V and the steering angle $\theta$ at that time, as indicated at d3, or d4. Thus the position of the bright spot on the display unit 56 indicates to the driver whether or not the carrier is approaching the region of danger. The measurements V and $\theta$ are read out from the RAM 42 with a very short cycle, and the latest data is given to the control means 55.

Figure 8:
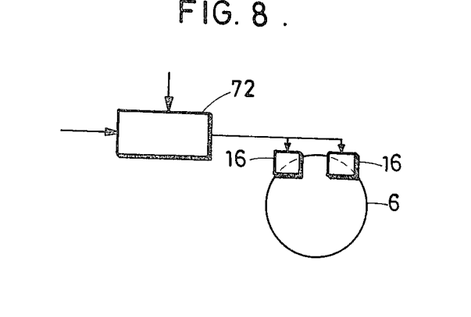
FIG. 8 is a block diagram showing an example of brake control means.

FIGS. 7 and 8 show exemplary clutch control means 52 and brake control means 54 respectively. With each of these means, a solenoid valve of a hydraulic circuit is controlled by the control signal. With the clutch control means 52, a valve 71 is opened by the first control signal to hydraulically disengage the clutch 58. With the brake control means 54, the second control signal opens a vale 72 to hydraulically operate the brakes 16 on the wheels 6. The control signals can be emitted as divided into a plurality of segments to control the degree of opening of the valves 71 and 72. The clutch and the brakes are of course controllable in some other mode in accordance with the construction thereof.

What is claimed is:

1. A system for preventing a vehicle from turning sideways comprising:
   means for measuring the weight of a cargo on the vehicle,
   means for measuring the height of gravitational center of the cargo on the vehicle,
   means for measuring the steering angle of the vehicle,
   means for measuring the running speed of the vehicle,
   means for determining the overall height of gravitational center of the vehicle and the cargo from the weight and the height of gravitational center of the vehicle and the measured weight and height of gravitational center of the cargo and deriving the static stability of the vehicle from the overall height of gravitational center,
   means for deriving the dynamic instability of the vehicle during turning from the measured steering angle and running speed,
   means for comparing the dynamic instability with the static stability and emitting a control signal when the instability is in excess of an allowable limit dependent on the stability, and
   speed control means for the vehicle controllable by the control signal.

2. A system as defined in claim 1 wherein a clutch provided between a running power source for the vehicle and drive wheels is disengaged by the speed control means.

3. A system as defined in claim 1 wherein the vehicle is braked by the speed control means.

4. A system as defined in claim 1 wherein the allowable limit is set in two stages, a clutch on the vehicle is disengaged upon the instability exceeding the first allowable limit, and the vehicle is braked upon the instability exceeding the second allowable limit.

5. A system as defined in claim 1 which further comprises display means for showing a graph representing the relation between the steering angle and the running speed allowable by the static stability.

6. A system as defined in claim 5 wherein a spot representing the measured steering angle and running speed is displayed on the display means.

7. A system for preventing a vehicle from turning sideways comprising:
   means for measuring the weight of a cargo on the vehicle,
   means for measuring the height of gravitational center of the cargo on the vehicle,
   means for measuring the steering angle of the vehicle,
   means for measuring the running speed of the vehicle,
   means for determining the overall height of gravitational center of the vehicle and the cargo from the weight and the height of gravitational center of the vehicle and the measured weight and height of gravitational center of the cargo and deriving the static stability of the vehicle from the overall height of gravitational center, and
   display means for showing a graph representing the relation between the steering angle and the running speed allowable by the static stability and a spot representing the measured steering angle and running speed.

* * * * *